United States Patent [19]

Asano

[11] 4,357,918
[45] Nov. 9, 1982

[54] ENGINE CONTROLLING DEVICE

[75] Inventor: Masaharu Asano, Yokosuka, Japan

[73] Assignee: Nissan Motor Co., Ltd., Yokohama, Japan

[21] Appl. No.: 173,760

[22] Filed: Jul. 30, 1980

[30] Foreign Application Priority Data

Jul. 31, 1979 [JP] Japan .................................. 54-97938

[51] Int. Cl.³ .............................................. F02P 5/04
[52] U.S. Cl. .................................... 123/425; 123/435
[58] Field of Search ................ 123/425, 435, 422, 423

[56] References Cited

U.S. PATENT DOCUMENTS

| 4,002,155 | 1/1977 | Harned et al. | |
| 4,060,714 | 11/1977 | Lappington et al. | 123/425 |
| 4,133,475 | 1/1979 | Harned et al. | |
| 4,153,020 | 5/1979 | King et al. | |
| 4,236,491 | 12/1980 | Hattori et al. | 123/425 |
| 4,245,602 | 1/1981 | Omori et al. | 123/425 |

FOREIGN PATENT DOCUMENTS

| 16547 | 1/1980 | European Pat. Off. | 123/425 |
| 2731841 | 2/1979 | Fed. Rep. of Germany | |
| 55-19931 | 2/1980 | Japan | 123/425 |
| 2021690 | 12/1979 | United Kingdom | |
| 2055147 | 2/1981 | United Kingdom | 123/425 |

Primary Examiner—P. S. Lall
Attorney, Agent, or Firm—Schwartz, Jeffery, Schwaab, Mack, Blumenthal & Koch

[57] ABSTRACT

An engine controlling device includes an operating circuit (3) supplied with output signal of a knocking sensor (1) to generate a control signal which is used to effect an optimum control of at least one of ignition timing, exhaust gas recirculation flow rate, fuel injection quantity and fuel injection timing, to optimize combustion state of the engine. The device is further provided with an acceleration detector (5) whose output signal is supplied to the operating circuit (3) to generate a forced control signal during the accelerating condition of the engine regardless of the control signal derived from the knocking sensor (1). The forced control signal is used to control at least one of the above-mentioned control variables, and eliminates adverse influence of delay time in the control device to enable optimization of the combustion state even during a sudden acceleration.

8 Claims, 12 Drawing Figures

ENGINE CONTROLLING DEVICE

BACKGROUND OF THE INVENTION

1. Field of the Invention

The present invention relates to a device which effects a feed-back control of the ignition timing or other suitable control variable of an engine by detecting the knocking produced in the engine.

2. Background of the Invention

In a general engine, it is known that a continuous strong knocking state adversely affects the durability of the engine while a relatively weak knocking state in the low revolution speed range of the engine provides optimum fuel consumption and engine power output characteristics. The occurence of knocking is a closely related to the ignition timing, and tends to be enhanced as the ignition timing is advanced.

Devices are known which maintains a weak knocking state by detecting the knocking state and advancing or retarding the ignition timing in response to the detected knocking state, in order to optimize the operating characteristics of the engine.

When a knocking state is detected in such a conventional device the ignition timing is actually regulated after a predetermined period which corresponds to the delay time in the response characteristic of the feed-back control system. Thus, for variations in the knocking state which are slow with regard to the predetermined period, the ignition timing can be positively controlled in an optimum manner.

In a transitional driving condition in which the driving condition changes suddenly, the knocking state also changes suddenly. However, the ignition timing cannot be controlled as quickly as desired in response to sudden variations of the knocking state due to the abovementioned delay time. Thus an optimum control of the ignition timing may not be effected during transitional driving conditions.

The knocking state tends to be enhanced during the transitional driving condition of acceleration of the vehicle therefore ignition timing should be retarded as quickly as possible. On the other hand, in order to stabilize the control or to prevent hunting, the ignition timing can only be retarded at a predetermined limited rate, and not as quickly as required. The result is an inability to control the ignition timing in an optimum manner during the sudden acceleration so that the combustion, fuel consumption and output power characteristics will show a marked tendency to deteriorate.

SUMMARY OF THE INVENTION

Therefore, an object of the present invention is to provide an improved control device for an engine, which effects optimum control of the combustion during transitional driving conditions, even during sudden acceleration of the vehicle.

According to the present invention, there is provided an engine controlling device comprising in combination:

knocking detecting means which detects pressure variation in a combustion chamber of the engine or vibration resulting from the pressure variation, and discriminates a knocking state;

operating and controlling means responsive to said knocking detecting means and adapted to generate a feed-back control output signal for controlling at least one of ignition timing, exhaust gas recirculation flow rate, fuel injection quantity and fuel injection timing such that the knocking state is optimized; and means to detect a transitional driving condition of the engine, adapted to control said operating and controlling means during the transitional driving condition such that the operating and controlling means generates a forced control output signal regardless of said feed-back control output signal derived from the knocking state, said forced control output signal controlling said at least one of ignition timing, exhaust gas recirculation flow rate, fuel injection quantity and fuel injection timing, in the direction in which the knocking state is avoided so that a weak knocking state is maintained.

The operating and controlling means of the present invention generates a feed-back control signal having a level which decreases at a predetermined rate when the operating and controlling means is supplied by the knocking detecting means with a knocking signal indicating occurrence of the knocking, and which increases at a rate lower than the decreasing rate when said operating and controlling means is not supplied with the knocking signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention will now be more particularly described, by way of example, with reference to the accompanying drawings, wherein.

DETAILED DESCRIPTION OF THE DRAWINGS

Figure 1:
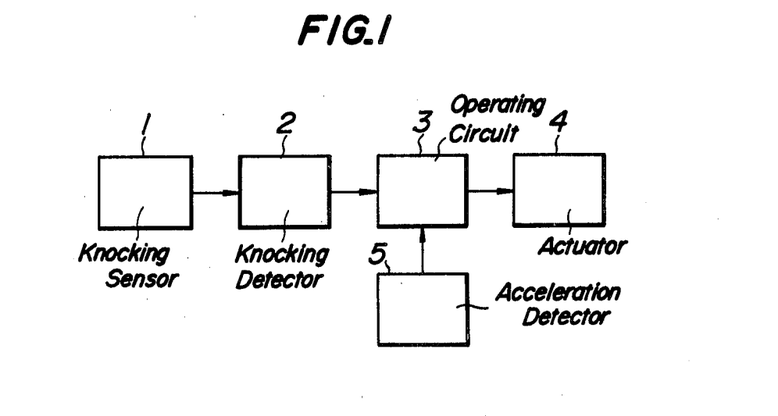
FIG. 1 shows a block diagram of the device according to one embodiment of the present invention.

Referring to FIG. 1, the controlling device of an engine according to one embodiment of the present invention comprises a knocking sensor 1, a knocking detector 2, an operating circuit 3, an actuator 4 and an acceleration detector 5.

It is known that each time the knocking occurs, the pressure in the combustion chamber of the engine varies and the level of pressure variation causes vibration having a component of particular frequency which increases. Such an increased level may be used to detect the occurrence of the knocking. Thus, the knocking sensor 1 detects the pressure variation in the combustion chamber or various vibrations caused by such a pressure variation, e.g. a vibration of the engine body or a sound wave emitted from the engine body. The signal detected by the sensor 1 is converted into an electrical signal. The knocking sensor 1 may consist of a resonance-type vibration sensor having a resonance frequency substantially identical with the above-mentioned particular frequency of the pressure variation component.

Figure 2:
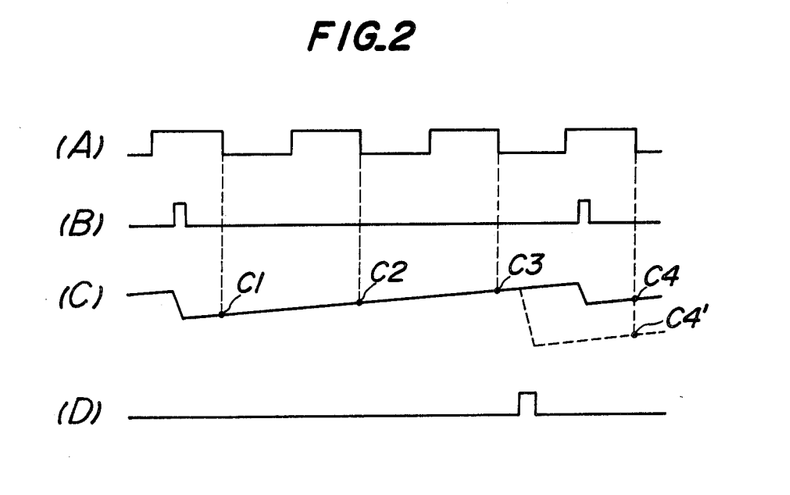
FIG. 2 shows typical signal waveforms of the device of FIG. 1.

The detector 2 discriminates occurrence of significant knocking based on the level of the output electrical signal of the sensor 1. More particularly, the component of the output signal of the sensor 1, which has the abovementioned particular frequency, is selected by the detector 2 and the level of such a component is used to detect the occurrence of significant knocking. However, this selection is not required when the resonance-type vibration sensor is used. As the knocking is detected, the detector generates a knocking signal or pulse having a width corresponding to a predetermined period, as shown in FIG. 2 at B.

Figure 3:
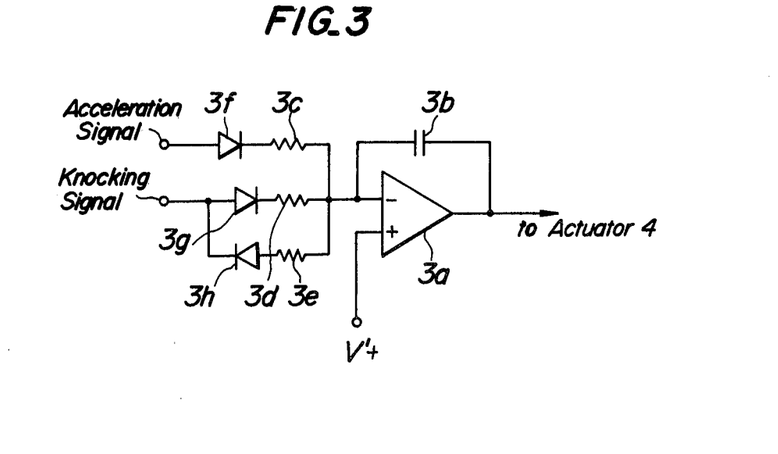
FIG. 3 shows a circuit diagram of one embodiment of the operating circuit of the device shown in FIG. 1.

Referring to FIG. 3, the operating circuit 3 is a charging and discharging circuit which includes an operational amplifier 3a, a capacitor 3b, resistors 3c, 3d and 3e as well as diodes 3f, 3g and 3h. As shown in FIG. 2 at c, except during an accelerating condition, when the pulse representing the occurrence of the knocking is applied to the operating circuit 3, this circuit generates an output voltage signal which decreases gradually at a predetermined rate and when such a pulse is not applied to the circuit 3, it generates an output voltage signal which increases at a less steep rate.

The decreasing rate is determined by the value of the resistor 3d and the capacitor 3b, while the increasing rate is determined by the value of the resistor 3e and the capacitor 3b.

The actuator 4 controls, in response to the output signal from the operating circuit 3, at least one of the ignition timing, flow rate of exhaust gas recirculated to the combustion chamber to reduce formation of NOx product, fuel supply quantity, fuel injection timing in case of a fuel injection type engine, and the like control variables of the engine.

Assuming that the ignition timing only is controlled by the actuator, the actuator 4 advances or retards the ignition timing in proportion to the output voltage level (e.g. $C_1$, $C_2$, $C_3$, $C_4$ as shown in FIG. 2) of the operating circuit 3 at each end of contact point pulses (shown in FIG. 2 at A) which are synchronous with the crank shaft rotation. The ignition timing may be controlled at points other than the time points corresponding to the levels $C_1$, $C_2$, $C_3$ and $C_4$. For example, the output voltage levels at other time points determined by the signals of other angular positions of the crank shaft may be used to control the ignition timing.

If, for example, the output waveform of the operating circuit 3 is as shown by the solid line C in FIG. 2, the voltage drop due to the occurrence of knocking results in a decreased output voltage level $C_1$ immediately after the occurrence of the knocking. Consequently, the first ignition immediately after the occurrence of the knocking is effected with a relatively retarded angle with reference to the ignition before the knocking occurs.

Until a subsequent knocking occurs, the output voltage increases at the predetermined rate and the level of the output voltage becomes such that $C_1 < C_2 < C_3$. Accordingly, with reference to the above-mentioned first ignition immediately after the occurrence of the knocking corresponding to the output level $C_1$, the subsequent ignition corresponding to the level $C_2$ is effected with a relatively advanced angle, and the further ignition corresponding to the level $C_3$ is effected with a further advanced angle.

In this way, the ignition timing is advanced as long as the knocking does not occur. However, with the increasing advance angle of the ignition timing, knocking will occur and decrease the output voltage level as shown at $C_4$ ($C_4 < C_3$). Accordingly, the subsequent ignition is effected with a relatively retarded angle as compared with the ignition before such an occurrence of the subsequent knocking.

By repeating the above operation, the ignition timing is controlled to be near the limit of occurrence of the knocking, to thereby maintain a weak knocking state so that the fuel consumption and the output power characteristics can be optimized.

The acceleration detector 5 detects the accelerating condition and generates an acceleration signal in response to which the output voltage level of the operating circuit 3 is forceably decreased. Thus, the ignition timing is retarded as quickly as required during the acceleration of the vehicle independently of the occurrence of knocking.

The accelerating condition of the vehicle can be detected in various manners, e.g. by detecting the variation rate of the opening degree of the throttle valve, intake negative pressure or intake air flow rate. Further, in case of an electronic fuel injection engine, the width of the pulses of the fuel injection signal is based on the intake air flow rate so that the variation of the width may be used to detect the accelerating condition.

Figure 4:
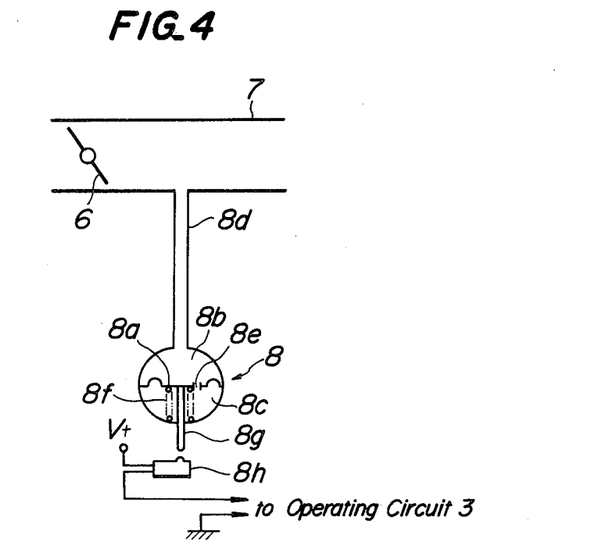
FIG. 4 shows a schematic view of one embodiment of the acceleration detector of the device shown in FIG. 1.

The variation of the intake negative pressure, for example, may be detected by a differential pressure switch 8 substantially as shown in FIG. 4, which is operated by the negative pressure within the intake conduit 7 downstream of the throttle valve 6.

The differential pressure switch 8 comprises a diaphragm 8a which defines two working chambers 8b and 8c. The first chamber 8b is connected with the conduit 7 through a connection pipe 8d having a substantial cross-section, and with the second chamber 8c through a narrow orifice 8e formed in the diaphragm 8a. As the throttle valve 6 is opened to accelerate the vehicle and the negative pressure in the conduit 7 decreases, the negative pressure within the chamber 8b decreases quickly whereas the negative pressure within the chamber 8c decreases at a slower rate. Thus, a pressure difference is generated between the two chambers 8b and 8c. By this, the diaphragm 8a is displaced downwardly in FIG. 4 against the force of a spring 8f, and an output rod 8g fixedly mounted on the diaphragm 8a closes a contact 8h so as to generate, during the acceleration, a pulse having a width corresponding to the magnitude of the acceleration.

The magnitude of the acceleration which can be detected by the detector 5 may be adjusted by varying the resilient force on the spring 8f or the cross-sectional area of the orifice 8e. For example, with a small cross-sectional area of the orifice 8e, even a slower acceleration can be detected. Thus, the spring 8f or the orifice 8e is adjusted such that the switch 8 generates a pulse only when the vehicle is suddenly accelerated.

Figure 5:
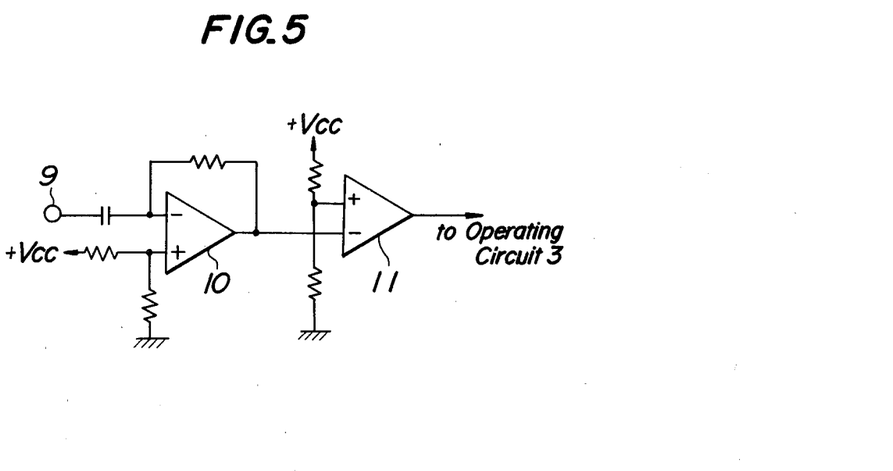
FIG. 5 shows a circuit diagram of another embodiment of the acceleration detector.

The accelerating condition can be detected from the variation of the intake negative pressure by another type of detector. As shown in FIG. 5, the detector comprises a pressure sensor 9 which generates a voltage signal proportional to the pressure within the intake conduit downstream of the throttle valve, a differentiating circuit or an operational amplifier 10 which differentiates the voltage signal from the sensor 9, and a comparator or an operational amplifier 11 which generates a pulse when the output signal of the differentiating circuit 10 exceeds a predetermined level.

Figure 6:
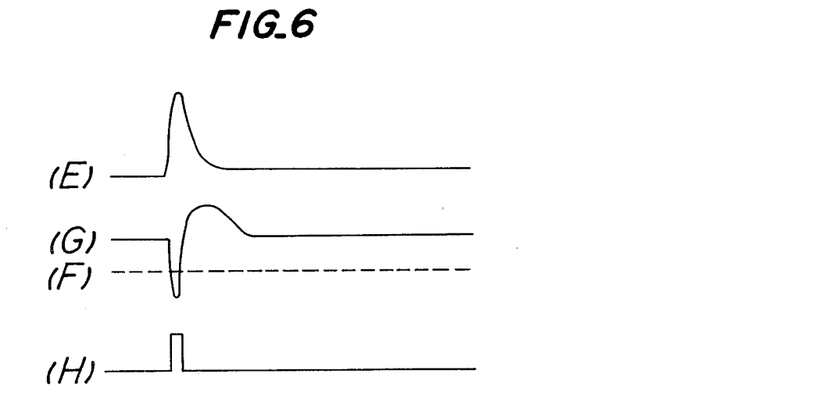
FIG. 6 shows typical signal waveforms of the acceleration detector of FIG. 5.

Assuming that the output voltage signal of the pressure sensor 9 has a waveform as shown in FIG. 6 at E, the output signal of the operational amplifier 10 or one of the input signals of the operational amplifier 11 has a waveform as shown in FIG. 6 at G. When said one of the input signals of the operational amplifier 11 is below the voltage level F of the other input signal of the amplifier 11, which is constant, the operational amplifier 11 generates a pulse signal as shown in FIG. 6 at H.

The voltage level of the other input signal of the operational amplifier 11 may be adjusted such that the amplifier 11 generates a pulse signal only when the vehicle is suddenly accelerated.

Figure 7:
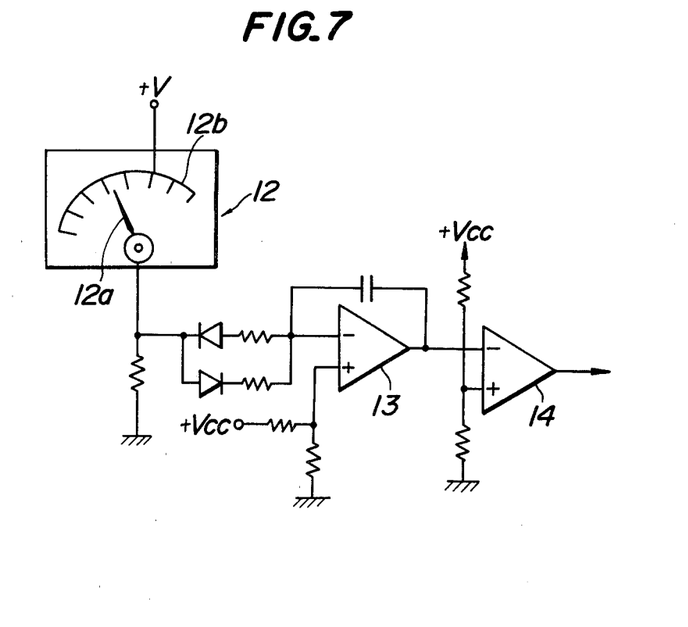
FIG. 7 shows a circuit diagram of still another embodiment of the acceleration detector.

The rate of variation in the opening degree of the throttle valve may be detected by a sensor 12 as shown in FIG. 7, which comprises a movable contact 12a adapted to rotate with the throttle valve, and fixed contacts 12b arranged to form a comb-teeth shape and contact with the movable contact 12a as the throttle valve is rotated to increase the opening degree.

Figure 8:
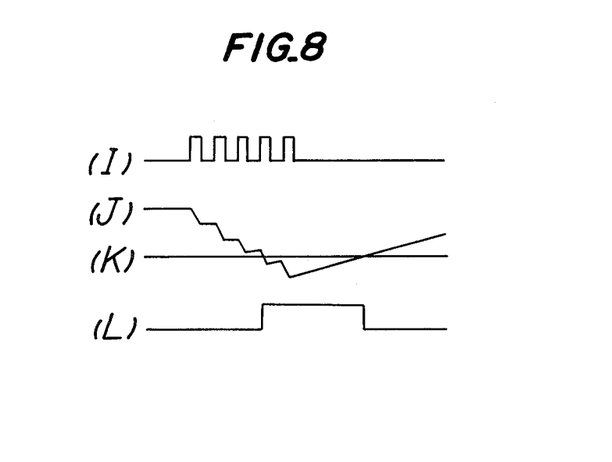
FIG. 8 shows typical signal waveforms of the acceleration detector of FIG. 7.

More particularly, when the throttle valve is opened, the sensor 12 generates a pulse train signal as shown in FIG. 8 at I, which is integrated by an integrating circuit or an operational amplifier 13, in such a manner that the integrated voltage has a decreasing level as shown in FIG. 8 at J. The integrated voltage is compared with a predetermined voltage K shown in FIG. 8, by a comparator or an operational amplifier 14. The comparator 14 generates a pulse as shown in FIG. 8 at L when the integrated voltage is below the predetermined voltage K.

The integrating circuit 13 generates a gradually increasing voltage to be added with the negatively integrated voltage when the circuit 13 is not supplied with the pulse signal from the sensor 12. Thus the comparator generates a pulse signal L only when the throttle valve is opened quickly and the sensor 12 generates a pulse train in which the pulses are spaced from each other by a small distance. By this, a only rapidly accelerating condition will be positively detected.

In this way, the acceleration detector 5 generates an acceleration pulse when the vehicle is accelerated suddenly, and the width of the pulse increases as the rate of the acceleration is high. In other words, the width of the pulse generated by the arrangement shown in FIGS. 4, 5 and 7 indicates the magnitude of the acceleration.

As the acceleration detector 5 generates a pulse D (FIG. 2) when the vehicle is suddenly accelerated, the output voltage of the operating circuit 3 decreases at a predetermined rate during the period in which the pulse D lasts, as shown by the broken line in FIG. 2 at C.

Corresponding to the decreased output voltage of the operating circuit 3, the output voltage level decreases to the level C'$_4$. The first ignition after detecting the acceleration is based on the voltage level C'$_4$, and is effected with a relatively retarded angle corresponding to the abovementioned voltage drop, when compared with the ignition before the detection of the acceleration.

In this way, the ignition timing is forceably retarded when the vehicle is suddenly accelerated, regardless of the presence of the knocking pulse by which a normal feed-back control is effected.

The decreased voltage level of the operating circuit 3 depends on the width of the acceleration pulse and hence on the magnitude of the acceleration. Consequently, the ignition timing is more retarded when the vehicle is more suddenly accelerated.

The value of the resistor 3c and the capacitor 3b of the operating circuit 3, which determines the voltage decreasing rate as previously stated, is so selected that at the time of sudden acceleration the ignition timing is quickly retarded in an optimum manner with regard to the magnitude of the acceleration. Thus an optimum control of the ignition timing with a superior response can be effected even during the acceleration.

A similar effect can be achieved by using a switch which is opened or closed at a predetermined opening degree of the throttle valve, and a mono-stable circuit which transforms the output signal of the switch into an acceleration pulse having a constant width. The acceleration pulse generated by the arrangement shown in FIGS. 4, 5 and 7 having a width corresponding to the magnitude of the acceleration may be transformed by a mono-stable circuit into a pulse having a constant width which is then supplied to the operating circuit 3.

The control output signal of the device is varied in the direction in which the ignition timing is advanced. The variation rate of the control output signal level is lower than the ignition advancing rate. In the embodiment shown in FIG. 3, the ignition timing is advanced at a normal rate even after the control is effected during acceleration. With such an arrangement, however, the ignition timing might be retarded too much when acceleration pulses are repeatedly generated. Although knocking shortly after the acceleration can be avoided, further acceleration might be impaired.

Figure 9:
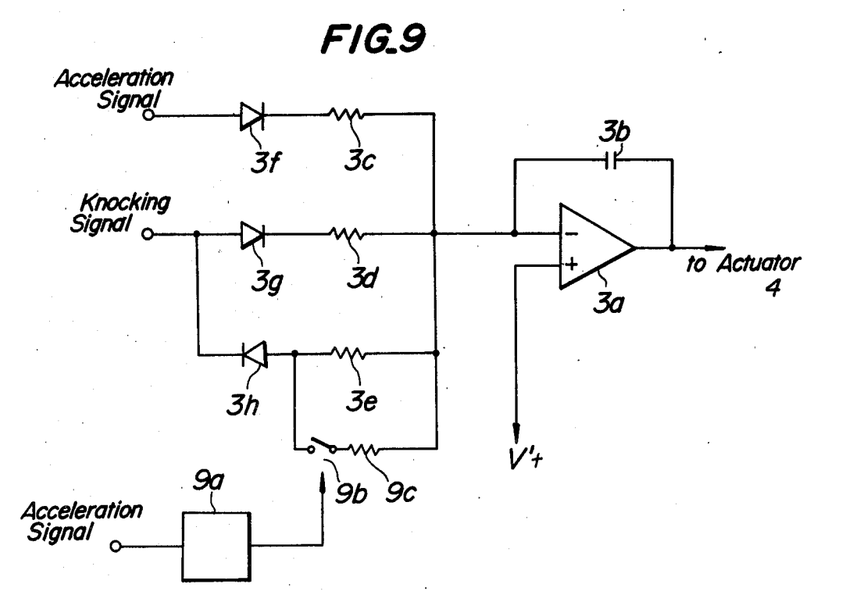
FIG. 9 shows a circuit diagram of another embodiment of the operating circuit.

In view of the above, as shown in FIG. 9, the operating circuit of FIG. 3 may further comprise a mono-stable circuit 9a, a switch 9b and a resistor 9c. The switch 9b may be closed during the interval I$_4$ of the waveform I of the acceleration pulse so that the increasing rate of the waveform C or the charging rate of the circuit 3 is increased. By this, an excessive retardation of the ignition timing can be avoided.

Figure 10:
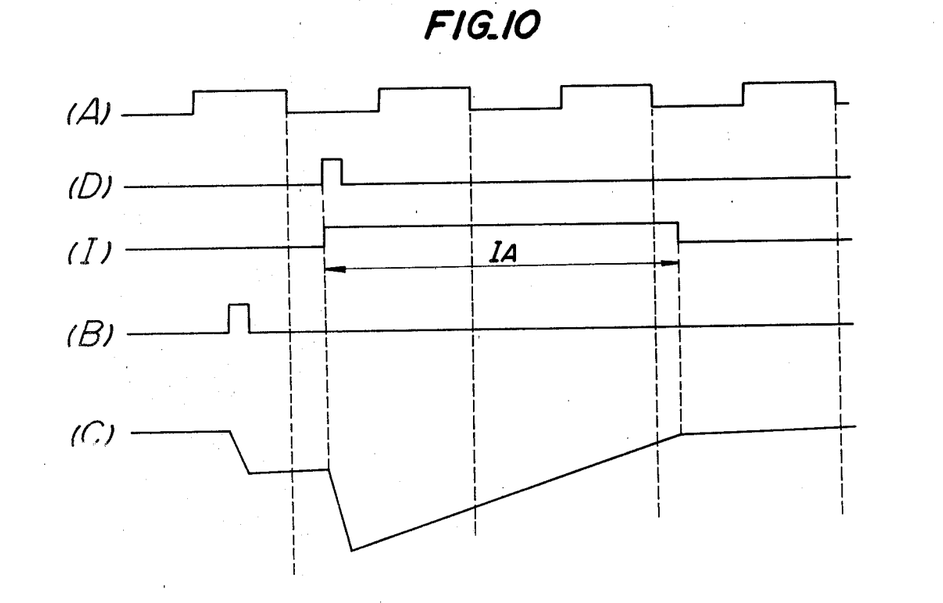
FIG. 10 shows a waveform diagram for explaining operation of the circuit of FIG. 9.
Figure 11:
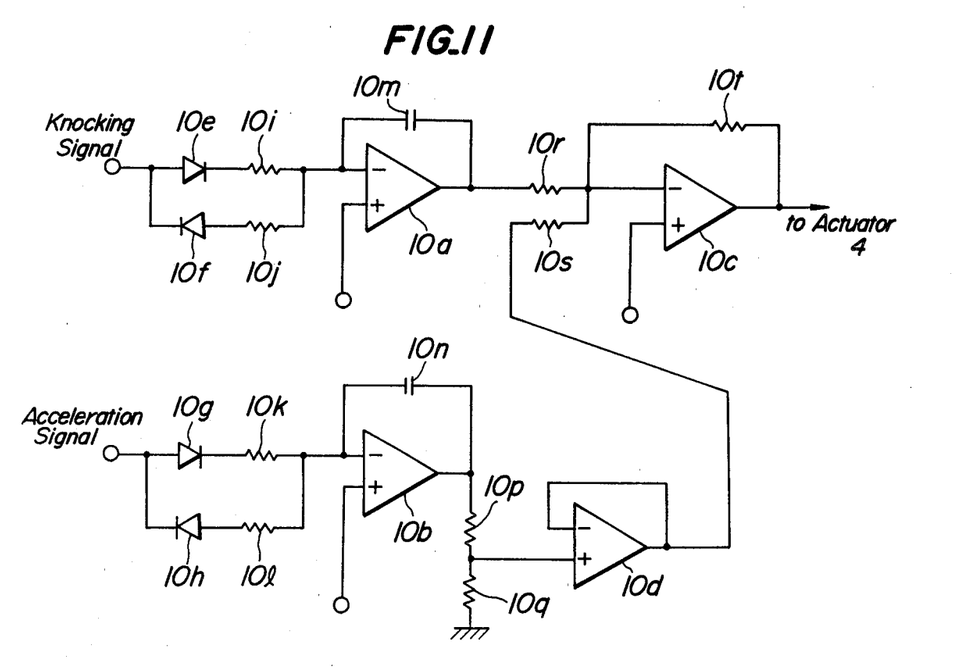
FIG. 11 shows a circuit diagram of still another embodiment of the operating circuit.
Figure 12:
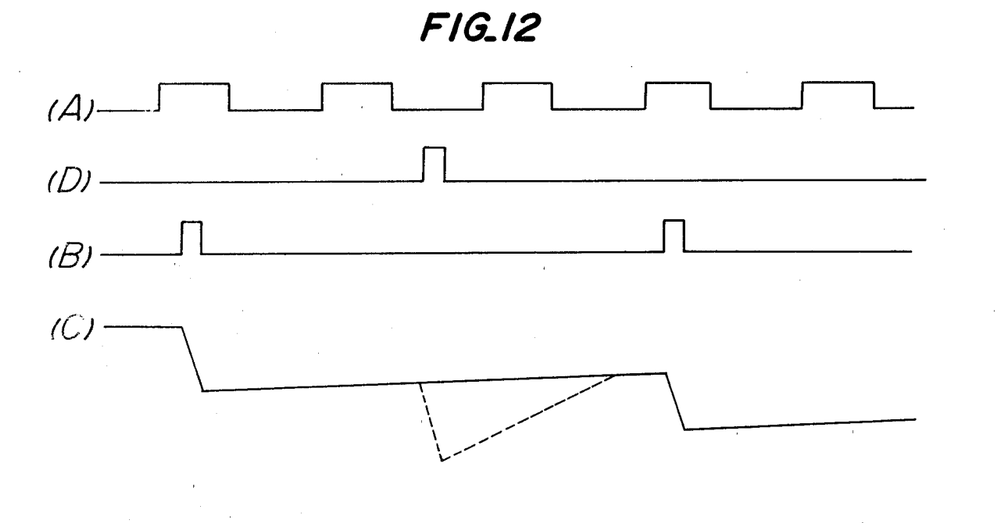
FIG. 12 shows a waveform diagram for explaining operation of the circuit of FIG. 11.

FIG. 11 shows another embodiment of the operating circuit which is similar in its function to the circuit of FIG. 9. An amplifier 10a, diodes 10e and 10f, resistors 10i and 10j as well as a capacitor 10m form a first portion which effects a normal feed-back control as shown by the solid line of the waveform C in FIG. 12. Amplifiers 10b and 10d, diodes 10g and 10h, resistors 10k and 10l, a capacitor 10n as well as resistors 10p and 10q form a second portion which effects a compensating operation during the acceleration. Output signals of the first and the second portions are added by a third portion consisting of an amplifier 10c and resistors 10r, 10s and 10t, and the output signal of the third portion has a waveform as shown by the broken line in FIG. 10 at C. The magnitude of this compensation during the acceleration can be determined independently of the normal feed-back control.

In the embodiment shown in FIG. 9, the acceleration compensation may not be nullified during the interval $I_A$ (FIG. 10) so that the control may be influenced by the compensation. The operating circuit of FIG. 11 avoids such a disadvantage.

In the embodiment shown in FIG. 11, the amplifier 10b or an integrating circuit may be saturated by a first accelerating signal D so that even when the accelerating signals are repeatedly applied thereto before the accelerating compensation is nullified, the maximum compensating level remains unchanged.

The function of the embodiments of FIGS. 9 and 11 may be achieved by a stored programme type computer. Retardation of the ignition timing and the returning rate of the compensation may be controlled by other parameters. The returning rate may be constant, or may be varied e.g. proportionally to the revolutional speed of the engine. This is advantageous since in the high revolutional speed range the compensation can be nullified quickly.

Although the present invention has been described with reference to specific embodiments in which a strong knocking state during acceleration is avoided by detecting the knocking state and controlling the ignition timing, exhaust gas recirculation flow rate, fuel supply quantity, fuel injection timing and other suitable variables may be controlled in a similar manner in order to achieve the same object. Further, the transitional driving condition represented by an accelerating condition includes a decelerating condition in which a similar control may be effected.

As is apparent from the foregoing, according to the present invention, the ignition timing, exhaust gas recirculation flow rate, fuel injection timing, fuel injection quantity or other similar control variable is subjected to an optimum control during the transitional driving condition, e.g. in response to the magnitude of acceleration during the accelerating condition. Accordingly, an optimum control of the combustion state of the engine is effected to provide improved fuel consumption and output power characteristics as well as a superior response characteristic during the transitional driving condition.

The foregoing description of the preferred embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An engine controlling device comprising in combination:
   knocking detecting means which detects pressure variation in a combustion chamber of the engine or vibration resulting from the pressure variation, and discriminates a knocking state;
   operating and controlling means responsive to said knocking detecting means and adapted to generate a feed-back control output signal for controlling at least one operational parameter of the engine, which is influential in occurrence of the knocking, such that the knocking state is optimized;
   said feed-back control signal having a level which decreases at a predetermined rate when said operating and controlling means is supplied by said knocking detecting means with a knocking signal indicating an occurrence of knocking, and which increases at a rate lower than said decreasing rate when said operating and controlling means is not supplied with said knocking signal; and
   means for detecting a transitional driving condition of the engine and for controlling said operating and controlling means during the transitional driving condition such that the operating and controlling means generates a forced control output signal regardless of said feed-back control output signal derived from the knocking state, said forced control output signal controlling said at least one operational parameter of the engine, in the direction in which the knocking state is avoided so that a weak knocking state is maintained.

2. An engine controlling device as claimed in claim 1, wherein said transitional driving condition detecting means detects an accelerating condition of the engine based on a variation rate of throttle valve opening degree or intake negative pressure.

3. An engine controlling device as claimed in claim 2, wherein said transitional driving condition detecting means generates an acceleration pulse having a width representing the magnitude of the acceleration.

4. An engine controlling device as claimed in claim 3, wherein said operating and controlling means generates said forced control output signal during the period corresponding to the width of said acceleration pulse.

5. The engine controlling device of claim 1, wherein said at least one operational control parameter of the engine consists of at least one of ignition timing, exhaust gas recirculation flow rate, fuel injection quantity or fuel injection timing.

6. An engine controlling device as claimed in claim 1, wherein said operating and controlling means generates said forced control signal whose level decreases at a predetermined rate.

7. An engine controlling device as claimed in claim 6, wherein said decreasing rate of the level of the forced control signal is varied in accordance with rotational speed of the engine.

8. An engine controlling device as claimed in claim 6 or 7, wherein said forced control signal has a level which is within a predetermined range.

* * * * *